US006109210A

United States Patent [19]
Nasser

[11] Patent Number: 6,109,210
[45] Date of Patent: Aug. 29, 2000

[54] FISH FEEDING DEVICE AND GAME

[76] Inventor: Frank Nasser, 41 Manorgien Cres., Toronto, Ontario, Canada, M1S 1W3

[21] Appl. No.: 09/121,183

[22] Filed: Jul. 23, 1998

[51] Int. Cl.[7] ............................ A01K 29/00; A01K 61/02
[52] U.S. Cl. ........................ 119/51.04; 119/702; 119/256
[58] Field of Search ..................................... 119/245, 256, 119/51.04, 702, 703, 704, 751, 711

[56] References Cited

U.S. PATENT DOCUMENTS

| | | |
|---|---|---|
| 2,761,422 | 9/1956 | Matin . |
| 3,361,114 | 1/1968 | Axelrod . |
| 3,465,719 | 9/1969 | Holden . |
| 3,499,526 | 3/1970 | Willinger . |
| 3,512,505 | 5/1970 | Cross et al. . |
| 3,643,632 | 2/1972 | Poirot ........................................ 119/54 |
| 3,664,303 | 5/1972 | Baensch ............................... 119/51.03 |
| 3,991,028 | 11/1976 | Baensch et al. . |
| 4,235,198 | 11/1980 | Goguel .................................. 119/51.04 |
| 4,237,820 | 12/1980 | Muller ................................... 119/51.04 |
| 5,128,153 | 7/1992 | Axelrod . |
| 5,660,576 | 8/1997 | Winga . |

Primary Examiner—Jack W. Lavinder
Assistant Examiner—Yvonne R. Abbott
Attorney, Agent, or Firm—Nancy E. Hill; Hill & Schumacher

[57] ABSTRACT

The fish feeding game of the present invention includes a floating game device which defines the boundaries of the game and a floating fish feeding device. Movement of the floating fish feeding device within the boundaries of the game defines play of the game. The game could be a field type game like soccer or a game of chance like roulette. The fish feeding device of the present invention is for use in association with a plurality of resilient fish-food pieces. The fish-food pieces may be fish-food pellets, fish-food morsels or a combination thereof. The fish feeding device includes a floating portion having an outer surface, a central hollow portion and an aperture formed in the floating portion between the hollow portion and the outer surface. The hollow portion is for receiving the plurality of fish-food pieces. The aperture is dimensioned such that one of the plurality of resilient fish-food pieces will obstruct the aperture. The floating portion includes a spherical outer portion and a spherical inner portion with air or gas trapped therebetween and the inner portion defines the central hollow portion. Alternatively the floating portion is made from foam.

19 Claims, 2 Drawing Sheets

FISH FEEDING DEVICE AND GAME

FIELD OF THE INVENTION

This invention relates to floating feeding devices for aquatic animals and in particular to a fish feeder which allows fish to obtain the food directly from the feeder and in particular to a fish feeding game that is enabled by the fish and a fish feeding device.

BACKGROUND OF THE INVENTION

Fish feeding devices are known in the market. However, heretofore there have been no fish feeding devices that are used in conjunction with other devices to enable the playing of a game.

It is well known that fish, and other aquatic animals such as dolphins, whales, and seals, generally appear to be quiet and peaceful creatures. Generally, there is not much that they do that is eye-catching, or that arouses continued attraction, unless of course they are trained to do certain acts. Most of their activity occurs at feeding time. Accordingly, anyone who owns an aquarium, or has access to a body of fresh or salt water such as a tank, a pond, a lagoon, a lake, or even the ocean, can turn watching fish into a more amusing and entertaining experience, by appearing to engage the fish, or the like, in a game of sports, or a game of chance. In order to do this, one requires a ball, or the like, filled with food that will attract the fish, or the like, and a floating game device to define the sport or game. The movement of the ball, or the like, in the device defines the action in the game. Thus, the fish can "play" a game.

As discussed above, there are a number of prior art devices which are directed to devices for automatically feeding fish. For example U.S. Pat. No. 3,512,505 issued to Cross et al. shows a fish feeder that includes a body that floats on the water that has a column therein for receiving fish food. The body sits in the water such that only the lowermost capsule of food is in the water. The capsule of food is water soluble such that, once the capsule disintegrates, a charge of fish food is released into the water. Therefore, food is periodically released into the water on the disintegration of the capsule. Accordingly, there would be no reason for a fish to go to the fish feeder, rather, the fish would merely wait until the capsule dissolved, and then eat the food. Therefore, during feeding there would be no clear incentive for the fish to move the fish feeder.

Another example of a fish feeder is found in U.S. Pat. No. 3,993,028 issued to Baensch et al. This fish feeder includes a tubular portion for receiving the fish food and a floating member attached thereto. The tubular portion has an opening in the bottom thereof such that when the fish feeder is floating in the water, the fish can access the fish food. The fish food body contains a plurality of food particles that do not readily dissolve or disintegrate when they contact water. The fish food bodies are dimensioned to correspond with the inside of the tubular portion, and are arranged such that the contact point between adjacent fish food bodies is minimized, so as to minimize transfer from the lowest most body to the next adjacent body. In order for a fish to obtain some of the fish food the fish must go to the fish feeder and take the food out of the fish feeder, the food is not released automatically into the fish tank. A drawback to use of this fish feeder is that it needs to be used in conjunction with food bodies that are particularly dimensioned to correspond with the tubular portion.

Another prior art fish feeder is shown in U.S. Pat. No. 3,465,719 issued to Holden. The fish feeder is for use with live fish food. This fish feeder has an aperture in the bottom thereof which has a wicking plug. Thereby, over time, water from the aquarium slowly enters the container through the wick. The container is provided with an opening in one of the side walls, so that when the container has descended enough such that the opening is in the water, the live food in the container can leave the container and be consumed by the fish. This container clearly is only of particular use in conjunction with live fish.

SUMMARY OF THE INVENTION

The present invention is a fish feeding game. The fish feeding game of the present invention includes a floating game device which defines the boundaries of the game, and a floating fish feeding device. Movement of the floating fish feeding device within the boundaries of the game, defines play of the game. The game could be a field type game like soccer, or a game of chance like roulette.

Another aspect of the present invention is a fish feeding device for use in association with a plurality of resilient fish food pellets and/or fish food morsels. The fish feeding device includes a floating portion having an outer surface, a central hollow portion and an aperture formed in the floating portion between the hollow portion and the outer surface. The hollow portion is for receiving the plurality of fish food pellets and/or fish food morsels. The aperture is dimensioned such that one of the plurality of resilient fish food pellets and/or fish food morsels will obstruct the aperture. The floating portion includes a spherical outer portion and a spherical inner portion with air trapped therebetween, and the inner portion defines the central hollow portion. Alternatively the floating portion is made from foam.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
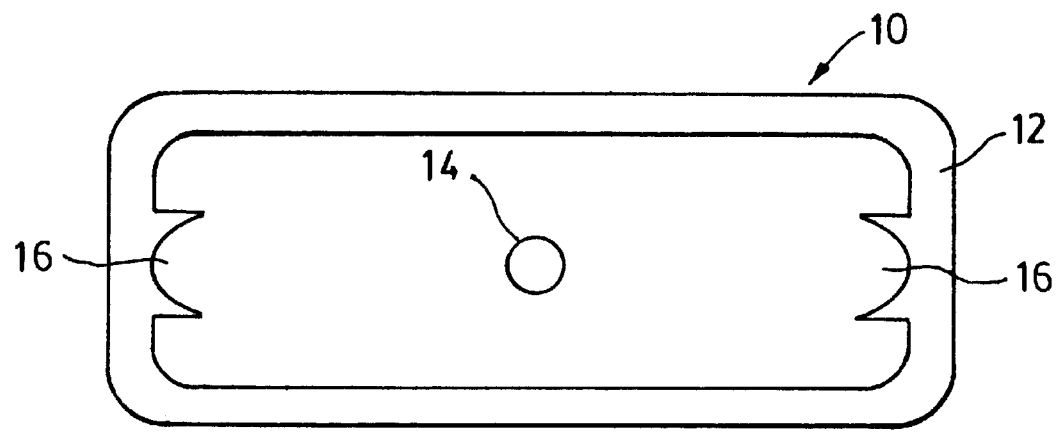
FIG. 1 is a top view of a fish feeding device in conjunction with a fish feeding game of the present invention, particularly a soccer-like game.

Referring to FIG. 1, the fish feeding game of the present invention is shown generally at 10. The fish feeding game includes a floating game device 12 and a floating fish feeding device 14.

The floating game device 12 defines the type of game that the fish are "playing". Game device 12 shown in FIG. 1 is a "soccer field" that is the shape of game device 12 mimic that found in a soccer field. Therefore when "playing" the game the floating fish feeding device may be put into play by placing it in the centre of the "soccer field", and when the fish start feeding on the food inside the fish feeding device 14, the device will move around the field. Accordingly, if the fish move the fish feeding device into a "goal" 16, that team scores a goal and then play can start again by placing the floating fish feeding device 14 back into the centre of the "field".

The floating game device 12 is constructed from a material with a lower density than water so that it always floats over the surface of the water. It could be made of plastic, wood, cork, hollow metal, or any other light material, hollow or filled.

Figure 2:
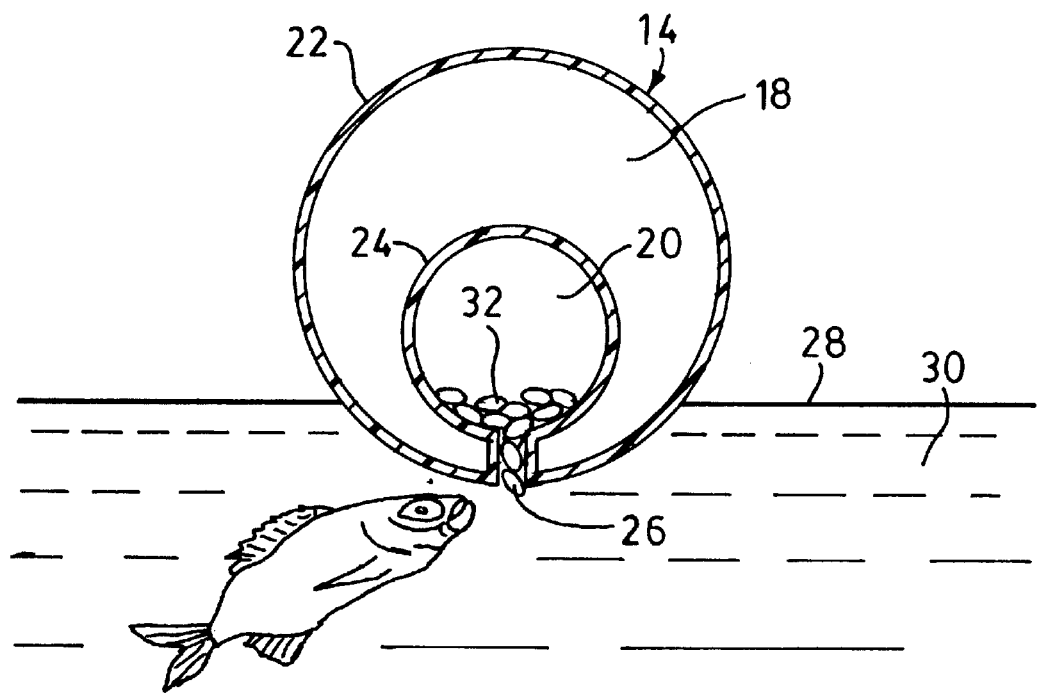
FIG. 2 is a cross sectional view of the fish feeding device constructed in accordance with the present invention.

The floating fish feeding device 14 is preferably a ball shown generally at 18 in FIG. 2. Ball 18 has a hollow central portion 20 for receiving the fish food. Ball 18 consists of two spheres, an outer sphere 22 with an outer sphere aperture and a smaller inner sphere 24 with an inner sphere aperture in registration with the outer sphere aperture. In FIG. 2 the outer sphere aperture and the inner sphere aperture are essentially shown as the same aperture and are shown generally at 26. The outer sphere 22 and the inner sphere 24 are connected together at their apertures forming a seal therebetween which is watertight and airtight. The air or other gas such as helium trapped between the outer sphere 22 and the inner sphere 24 is the buoyant matter that ensures that ball 18 will stay afloat. The weight of the inner sphere 24 ensures that aperture 26 faces downwardly under the surface 28 of the water 30.

Inside sphere 24 is filled, through aperture 26, with fish-food pieces 32. The fish-food pieces 32 may be fish-food pellets, fish-food morsels or a combination thereof. The fish-food pellets and morsels are commercially available in various sizes and compositions, and are classified as either "floating" or "sinking". Either type may be used, as long as the fish-food pieces are of a smaller diameter than the aperture. When the lowermost fish-food pellet or morsel touches the water, it expands and obstructs the opening. In addition, each fish-food pellet or morsel is resilient enough that a fish can easily pull it out of the aperture. As one fish-food pellet or morsel is pulled out, it will be replaced by another until the fish-food pellets or morsels are all consumed.

Ball 18 is made of light and thin plastic material such as vinyl, polypropylene, polyethylene and the like. It will be appreciated by those skilled in the art that ball 18 could have a number of shapes, ie., spherical or elliptical and it could be any size. The user would choose an appropriate size for the size of the fish or other aquatic animal. Outer sphere 22 of ball 18 may be smooth like a ping-pong ball, or grooved in imitation of a soccer ball, or designed in such a manner that allows stamping with advertising messages. Ball 18 could be any size and could be either spherical or oblong in shape. Small balls are adaptable for use with small fish and could be used in a home aquarium. Alternatively, large balls are adaptable for use with larger fish or aquatic animals and could be used in a large aquarium, a large tank, a pond, lagoon, a lake or an ocean.

Figure 3:
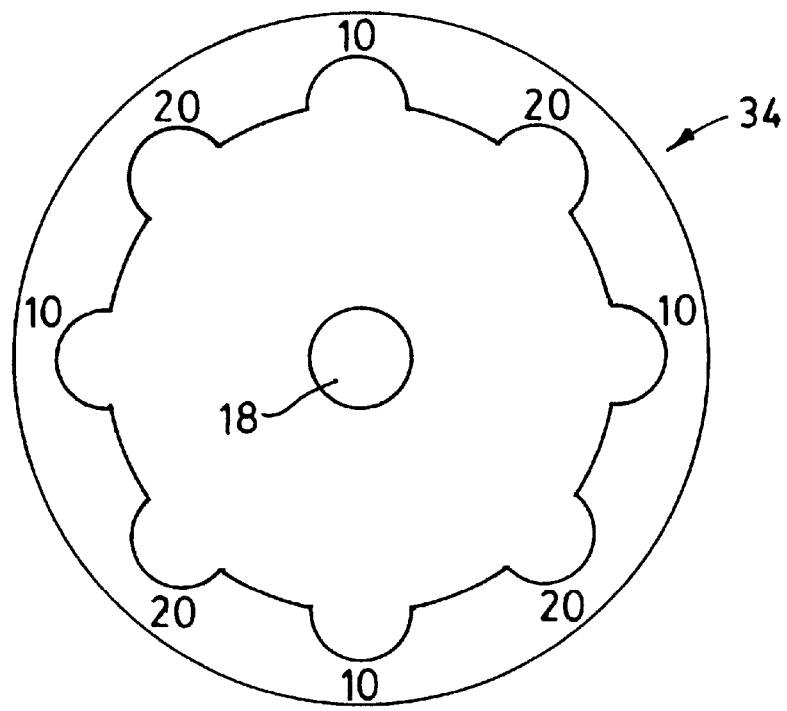
FIG. 3 is a top view of the fish feeding device in conjunction with an alternate fish feeding game of the present invention, particularly a roulette-like game.
Figure 4:
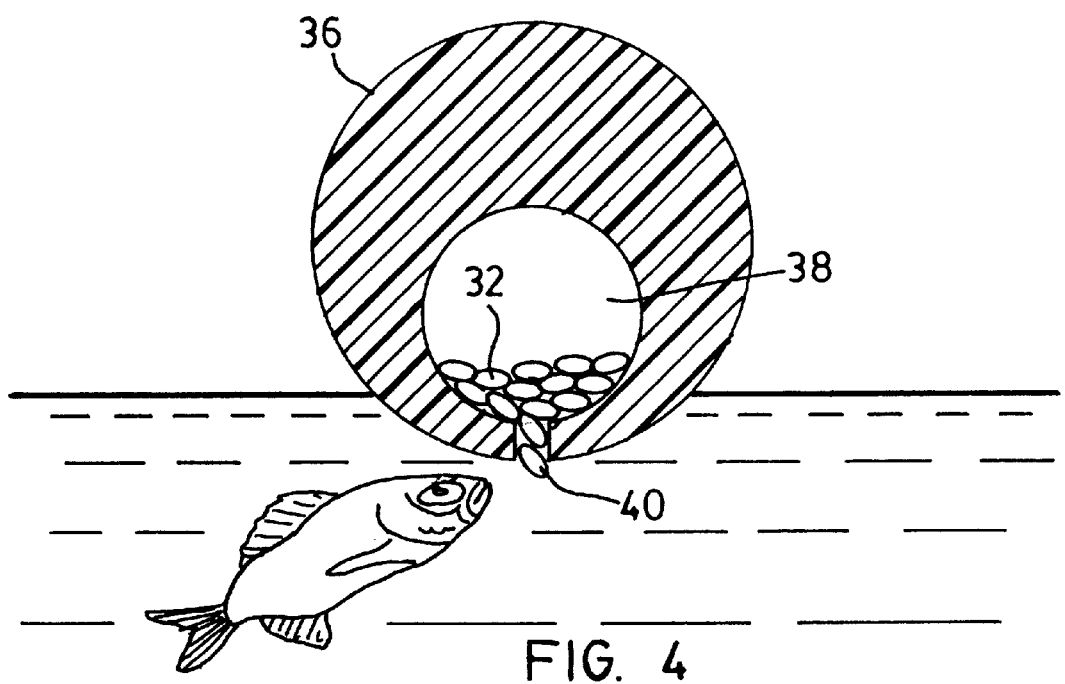
FIG. 4 is a cross sectional view of an alternate fish feeding device constructed in accordance with the present invention.

It will be appreciated by those skilled in the art that the floating game device 12 may be any shape or size, or simply scaled version of an existing game. For example the game could be a roulette-like game 34 shown in FIG. 3. Similarly, it will be appreciated by those skilled in the art that the floating fish feeding device could also be made of other buoyant materials. For example as shown in FIG. 4 the floating fish feeding device 36 could be made from Styrofoam with a hollow portion 38 and an aperture 40 contiguous with the hollow portion 38.

It will be appreciated by those skilled in the art that the above description related to the invention by way of example only. Many variations on the invention will be obvious to those skilled in the art and such obvious variations are within the scope of the invention as described herein whether or not expressly described.

What is claimed as the invention is:

1. A fish feeding game comprising:
   a floating game device defining an enclosed boundary and an open central portion for the game; and
   a floating fish feeding device wherein the position of the floating fish feeding device in the open central portion relative to the boundary defines play of the game and wherein the floating fish feeding device is adapted to move freely in the open portion of the floating game device.

2. A fish feeding game as claimed in claim 1 wherein the floating game device is in the shape of a soccer field.

3. A fish feeding game as claimed in claim 2 wherein the floating fish feeding device is shaped like a ball.

4. A fish feeding game as claimed in claim 1 wherein the floating game device is in the shape of a roulette wheel.

5. A fish feeding game as claimed in claim 4 wherein the floating fish feeding device is shaped like a ball.

6. A fish feeding game as claimed in claim 1 wherein the floating fish feeding device includes a floating portion having an outer surface, a central hollow portion formed in the floating portion for receiving the plurality of fish-food pieces, and an aperture formed in the floating portion between the hollow portion and the outer surface the aperture being dimensioned such that one of a plurality of resilient fish-food pieces will obstruct the aperture.

7. A fish feeding game as claimed in claim 6 wherein the floating portion includes a spherical outer portion and a spherical inner portion with gas trapped therebetween and the inner portion defines the central hollow portion.

8. A fish feeding game as claimed in claim 7 wherein the floating game device is in the shape of a soccer field.

9. A fish feeding game as claimed in claim 7 wherein the floating game device is in the shape of a roulette wheel.

10. A fish feeding game as claimed in claim 7 wherein the gas is air.

11. A fish feeding game as claimed in claim 7 wherein the gas is helium.

12. A fish feeding game as claimed in claim 6 wherein the floating portion is made from foam.

13. A fish feeding game as claimed in claim 12 wherein the floating game device is in the shape of a soccer field.

14. A fish feeding game as claimed in claim 12 wherein the floating game device is in the shape of a roulette wheel.

15. A fish feeding device for use in association with a plurality of resilient fish-food pieces chosen from the group of fish-food pellets, fish-food morsels and a combination thereof, comprising:
    a floating portion having an outer surface;
    a central hollow portion formed in the floating portion for receiving and enclosing the plurality of fish-food pieces, and
    an unrestricted aperture formed in the outer surface, the aperture providing an opening into the hollow portion and being dimensioned such that one of the plurality of resilient fish-food pieces will obstruct the aperture.

16. A fish feeding device as claimed in claim 15 wherein the outer surface of the floating portion is generally spherical.

17. A fish feeding device as claimed in claim 16 wherein the floating portion includes an outer portion and an inner portion with air trapped therebetween and the inner portion defines the central hollow portion.

18. A fish feeding device as claimed in claim 16 wherein the inner portion is generally spherical.

19. A fish feeding device as claimed in claim 16 wherein the floating portion is made of foam.

\* \* \* \* \*